US010654117B2

(12) United States Patent
Saffels et al.

(10) Patent No.: US 10,654,117 B2
(45) Date of Patent: May 19, 2020

(54) CUTTING TOOL ASSEMBLY FOR MILLING A RAIL TOP

(71) Applicant: Kennametal Inc., Latrobe, PA (US)

(72) Inventors: Michael David Saffels, Mogadore, OH (US); Elvin Charles Williams, Pottsboro, TX (US); Floyd Samuel Rosenbaum, Mentor, OH (US)

(73) Assignee: KENNAMETAL INC., Latrobe, PA (US)

( * ) Notice: Subject to any disclaimer, the term of this patent is extended or adjusted under 35 U.S.C. 154(b) by 646 days.

(21) Appl. No.: 15/060,168

(22) Filed: Mar. 3, 2016

(65) Prior Publication Data

US 2017/0252835 A1    Sep. 7, 2017

(51) Int. Cl.
*B23C 5/14* (2006.01)
*B23C 3/00* (2006.01)
(Continued)

(52) U.S. Cl.
CPC .............. *B23C 5/14* (2013.01); *B23C 3/005* (2013.01); *B23C 5/207* (2013.01); *E01B 31/13* (2013.01); *B23C 2200/123* (2013.01); *B23C 2200/203* (2013.01); *B23C 2200/367* (2013.01); *B23C 2210/242* (2013.01); *B23C 2210/244* (2013.01);
(Continued)

(58) Field of Classification Search
CPC ...... B23F 21/16; B23F 21/163; B23F 21/166; B23F 21/18; B23F 21/183; B23F 21/186; B23C 5/14; B23C 3/005; B23C 2200/123; B23C 2200/203; B23C 2200/367; B23C 2210/244; B23C 2210/285; B23C 2210/287; B23C 2210/325; B23C 2210/40; B23C 5/207
See application file for complete search history.

(56) References Cited

U.S. PATENT DOCUMENTS 1,495,067 A * 5/1924 Conklin ................ B23F 21/166
144/237
4,218,159 A * 8/1980 Langen ..................... B23C 5/12
407/25
(Continued)

FOREIGN PATENT DOCUMENTS

CN        2413827 Y      1/2001
CN       201140294 Y    10/2008
(Continued)

OTHER PUBLICATIONS

Feb. 9, 2018 First Office Action.
Nov. 25, 2019 Foreign OA.

*Primary Examiner* — Sara Addisu
(74) *Attorney, Agent, or Firm* — Larry R. Meenan

(57) ABSTRACT

A cutting tool assembly for milling a rail top, includes a first section and a second section mounted to the first section. Each section includes a plurality of insert-receiving pockets for receiving a plurality of different types of cutting inserts. The plurality of different types of cutting inserts are arranged in a plurality of helical teeth that may be separated by a helical chip flute. In one embodiment, a first type of cutting insert is formed with a radius, R, a second type of cutting insert is formed with a radius, R1, and a third type of cutting insert is formed with a radius, R2, to perform a milling operation on three different areas of the rail top.

20 Claims, 8 Drawing Sheets

(51) Int. Cl.
B23C 5/20 (2006.01)
E01B 31/13 (2006.01)

(52) U.S. Cl.
CPC .. *B23C 2210/285* (2013.01); *B23C 2210/287* (2013.01); *B23C 2210/325* (2013.01); *B23C 2210/40* (2013.01); *B23C 2215/32* (2013.01)

(56) References Cited

U.S. PATENT DOCUMENTS

| | | | | |
|---|---|---|---|---|
| 4,464,086 | A * | 8/1984 | Bentjens | B23C 5/12 407/25 |
| 5,577,954 | A | 11/1996 | Okumura | |
| 5,890,854 | A * | 4/1999 | Naumann | B23B 5/28 407/34 |
| 8,690,494 | B2 * | 4/2014 | Fang | B23C 5/109 407/61 |
| 9,834,891 | B2 * | 12/2017 | Hughes | E01B 31/13 |
| 2003/0167613 | A1 * | 9/2003 | Rydberg | B23B 29/24 29/27 C |
| 2008/0206007 | A1 * | 8/2008 | Hughes | B23C 3/30 409/51 |
| 2011/0243671 | A1 * | 10/2011 | Kretschmer | B23C 5/04 407/25 |
| 2013/0189045 | A1 * | 7/2013 | Behrens | E01B 31/13 409/132 |
| 2013/0202376 | A1 * | 8/2013 | Meyer | B23B 51/02 408/203 |
| 2014/0072376 | A1 * | 3/2014 | Sjoo | B23F 21/146 407/25 |
| 2014/0271012 | A1 * | 9/2014 | Hughes | E01B 31/13 409/132 |
| 2015/0321276 | A1 * | 11/2015 | Sjoo | B23F 21/166 407/25 |
| 2017/0252835 | A1 * | 9/2017 | Saffels | B23C 3/005 |

FOREIGN PATENT DOCUMENTS

| | | |
|---|---|---|
| CN | 201309018 Y | 9/2009 |
| CN | 201823994 U | 5/2011 |
| CN | 202539661 U | 11/2012 |
| CN | 103658799 A | 3/2014 |
| CN | 203817488 U | 9/2014 |
| CN | 107150140 A | 9/2017 |
| DE | 3222208 | 3/1985 |
| DE | 19917478 | 8/2004 |
| DE | 102006008093 | 9/2007 |
| DE | 20122924 | 4/2010 |
| DE | 102017103543 A1 | 9/2017 |
| EP | 1820902 B1 | 6/2011 |
| EP | 1983100 | 10/2013 |
| EP | 2896745 | 7/2015 |
| RU | 2279333 C1 | 7/2006 |

* cited by examiner

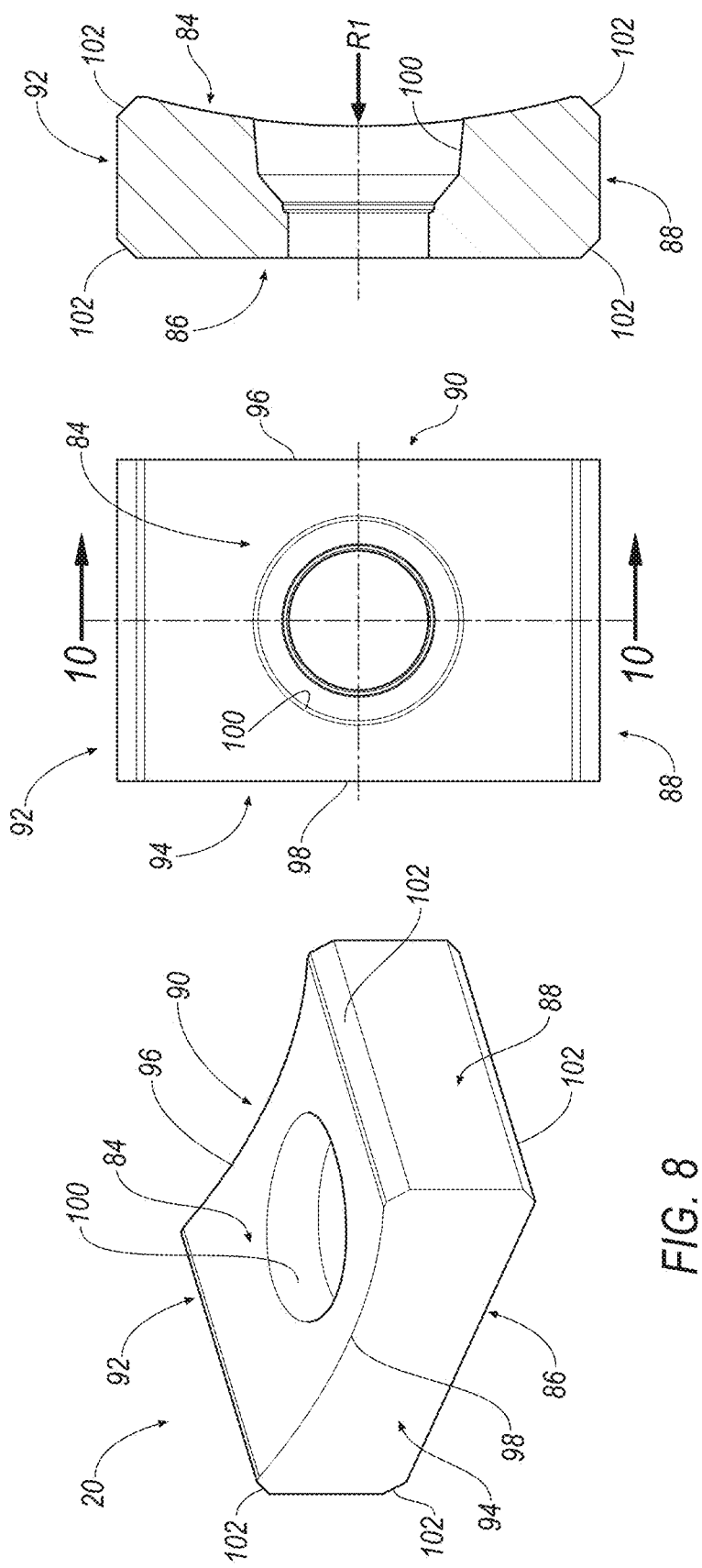

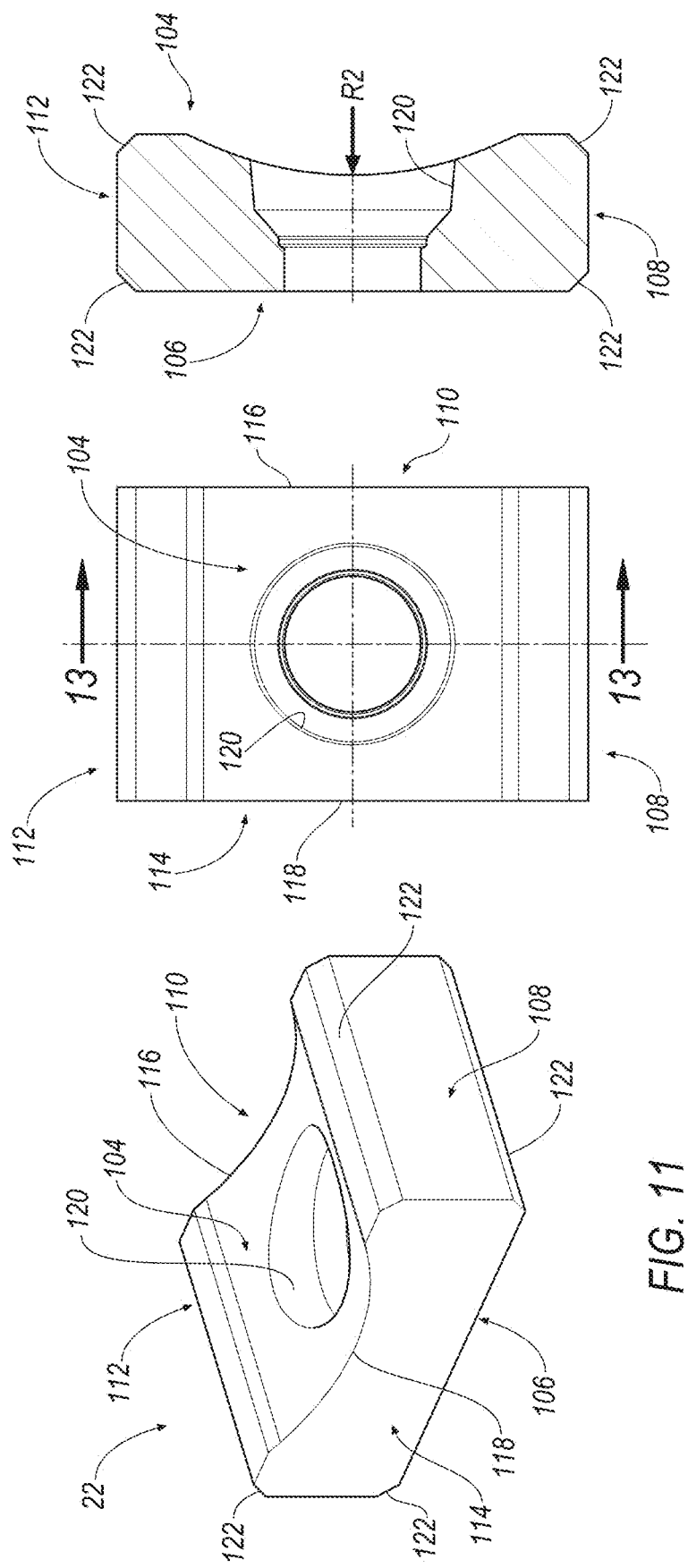

US 10,654,117 B2

CUTTING TOOL ASSEMBLY FOR MILLING A RAIL TOP

BACKGROUND OF THE INVENTION

Field of the Invention

The invention relates to a cutting tool. More particularly, the invention pertains to a cutting tool for milling a rail top with a plurality of different types of cutting inserts helically mounted on the cutting tool.

Description of Related Art

Conventional cutting tools for milling a rail top consists of random spacing of the cutting inserts and a square pocket design for the chip flutes. As a result, conventional cutting tools experience increased tool pressure, shortened tool life, and less efficiency during the milling of the rail form. Thus, there is a need to provide a cutting tool that provides smoother, efficient milling of the rail form, while providing consistent tool pressure, thereby improving tool life.

SUMMARY OF THE INVENTION

The problem of providing a cutting tool with smoother, efficient milling of a rail form, while providing consistent tool pressure and improving tool life is solved by helically mounting a plurality of different types of cutting inserts on the cutting tool.

In one aspect of the invention, a cutting tool assembly for milling a rail top comprises a first section, and a second section mounted to the first section. Each section includes a plurality of insert-receiving pockets for receiving a plurality of different types of cutting inserts, wherein the plurality of different types of cutting inserts are arranged in a plurality of helical teeth separated by a helical chip flute.

In another aspect of the invention, a cutting tool assembly for milling a rail top comprises a first section, and a second section mounted to the first section. Each section includes a plurality of insert-receiving pockets for receiving a plurality of different types of cutting inserts arranged in a plurality of helical teeth separated by a helical chip flute, wherein the plurality of different types of cutting inserts comprises a first type of cutting insert having a top surface formed with a radius, R, a second type of cutting insert having a top surface formed with a first radius, R1, smaller than the radius, R, and a third type of cutting insert having a top surface formed with a second radius, R2, smaller than the first radius, R1.

In yet another aspect of the invention, a cutting tool assembly for milling a rail top comprises a first section, and a second section mounted to the first section. Each section includes a plurality of insert-receiving pockets for receiving a plurality of different types of cutting inserts arranged in a plurality of helical teeth separated by a helical chip flute, wherein the plurality of different types of cutting inserts comprises a first type of cutting insert having a top surface formed with a radius, R, a second type of cutting insert having a top surface formed with a first radius, R1, smaller than the radius, R, and a third type of cutting insert having a top surface formed with a second radius, R2, smaller than the first radius, R1. The first type of cutting insert contacts sidewalls, and contacts a top surface of the rail top in an area of a longitudinal plane of the cutting tool assembly, and the second type of cutting insert contacts a first curved portion of the rail top, and the third type of cutting insert contacts a second curved portion of the rail top during a milling operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 8 is an isometric view of a second type of cutting insert used in the cutting tool assembly according to an embodiment of the invention;

FIG. 9 is a top view of the second type of cutting insert of FIG. 8;

FIG. 10 is a cross-sectional view of the cutting insert taken along line 10-10 of FIG. 9;

FIG. 11 is an isometric view of a third type of cutting insert used in the cutting tool assembly according to an embodiment of the invention;

FIG. 12 is a top view of the second type of cutting insert of FIG. 11;

FIG. 13 is a cross-sectional view of the cutting insert taken along line 13-13 of FIG. 12.

DETAILED DESCRIPTION OF THE INVENTION

Figure 1:
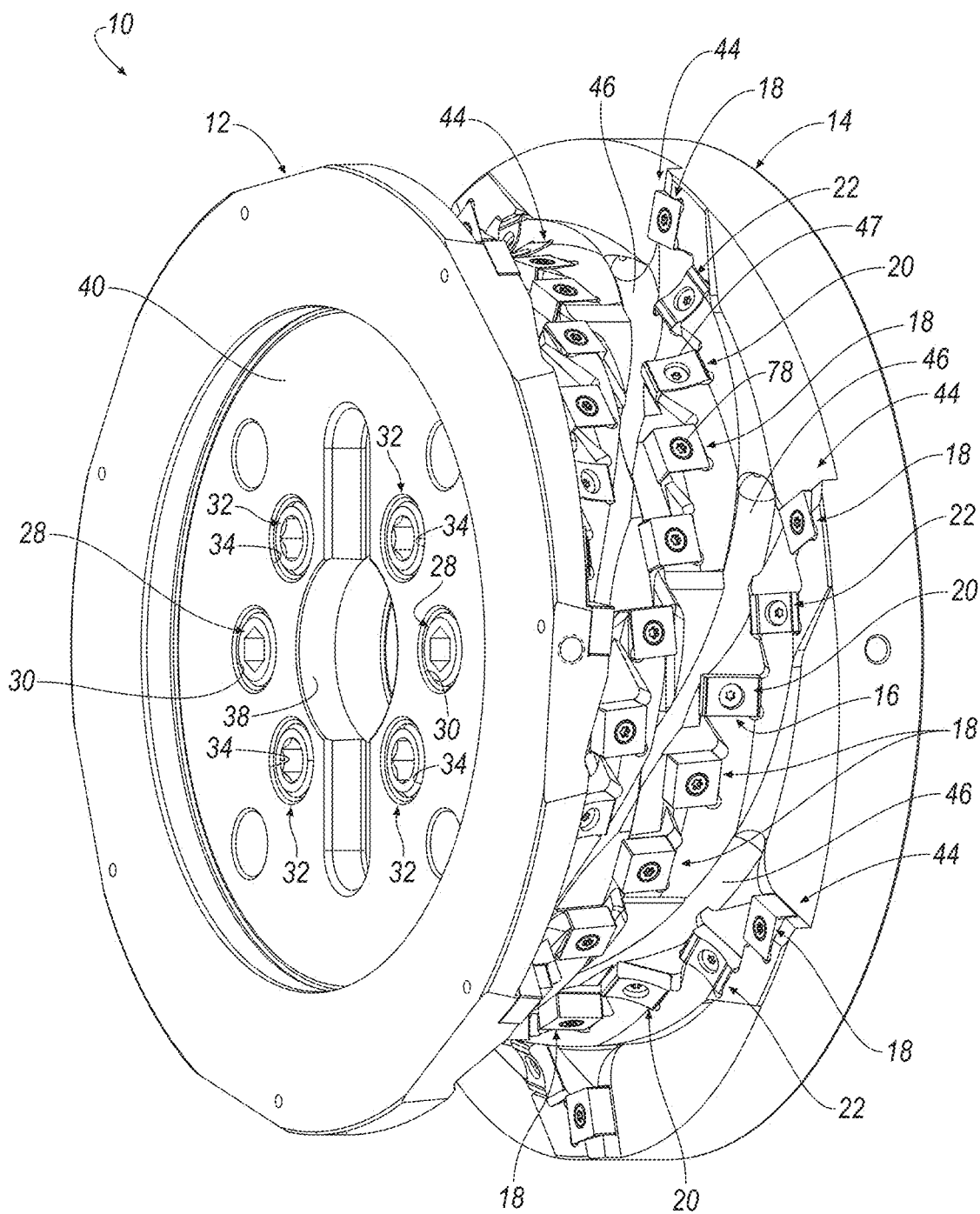
FIG. 1 is an isometric view of a cutting tool assembly with helically-arranged cutting inserts and chip flutes for milling a rail top in accordance with an embodiment of the invention.
Figure 2:
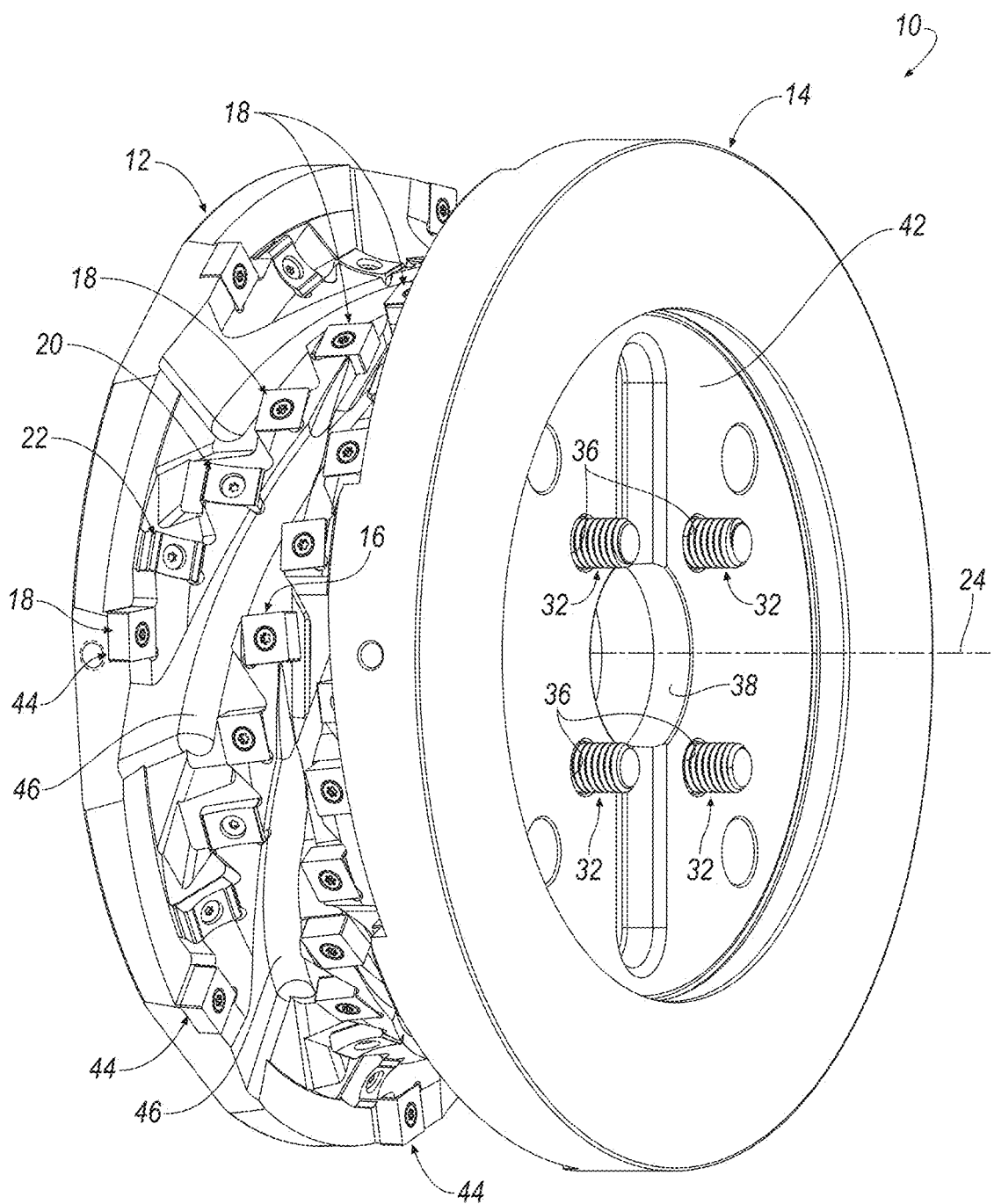
FIG. 2 is another isometric view of the cutting tool assembly of FIG. 1.
Figure 3:
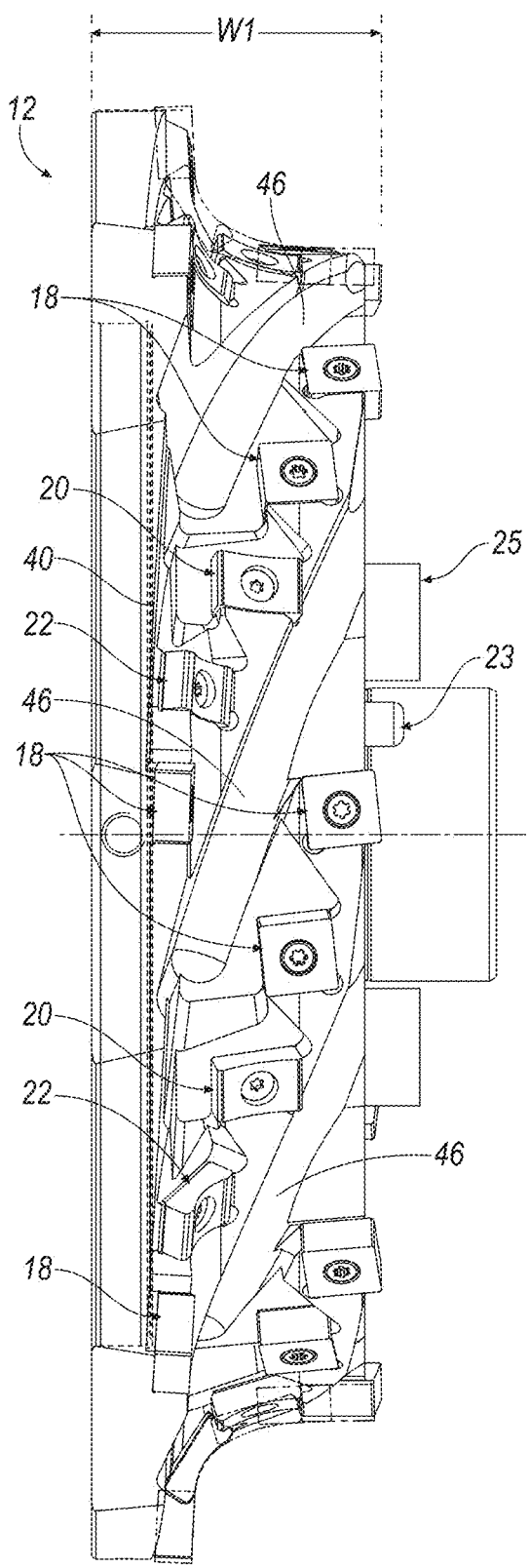
FIG. 3 is a front view of the left-handed section of the cutting tool assembly of FIG. 1.
Figure 4:
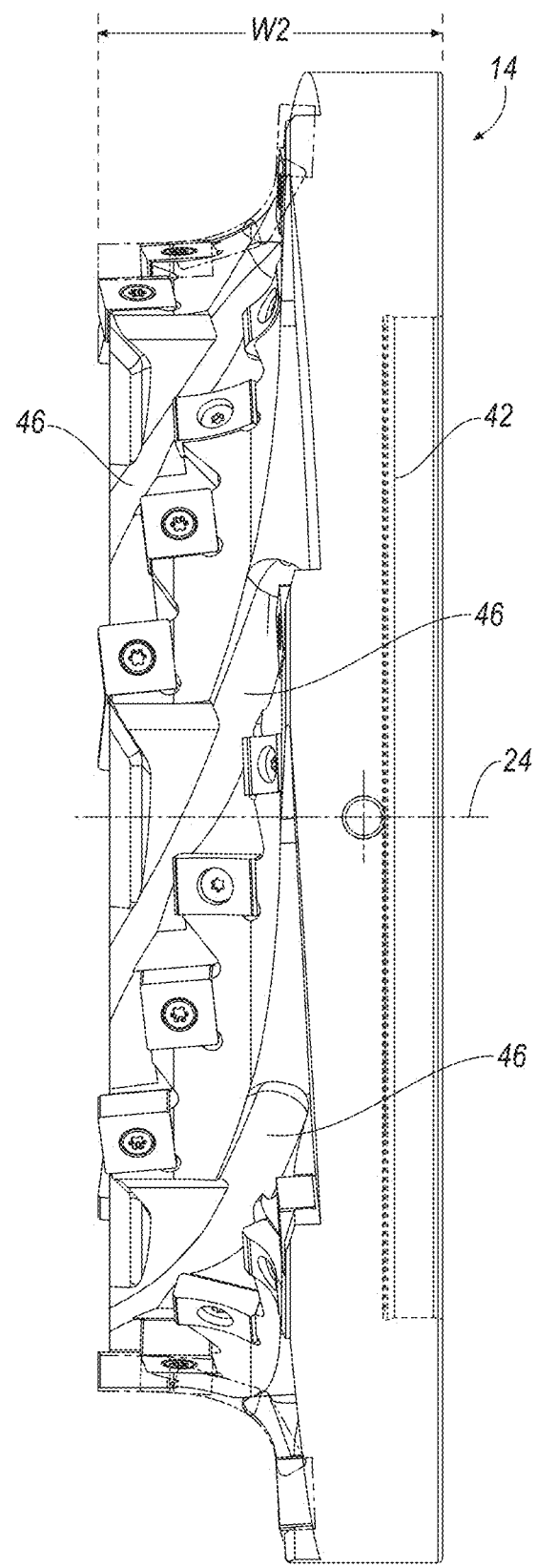
FIG. 4 is a front view of the right-handed section of the cutting tool assembly of FIG. 1.
Figure 5:
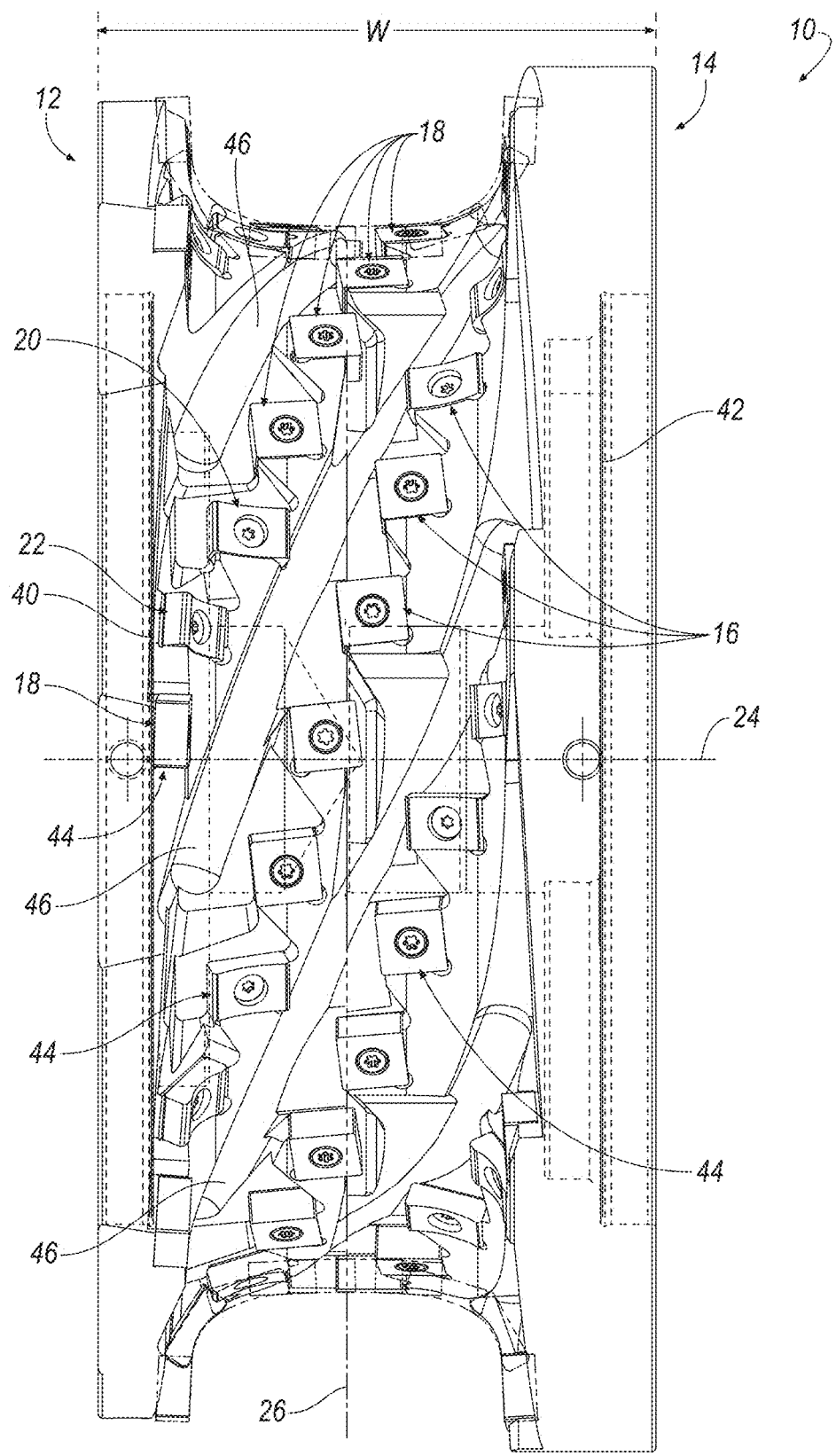
FIG. 5 is a front view of the cutting tool assembly of FIG. 1.

Referring now to FIGS. 1-5, a cutting tool assembly 10, for example, a form mill for milling a rail top 200, includes a first section 12 and a second section 14 mounted to the first section 12. In general, each section 12, 14 includes a plurality of insert-receiving pockets 16 for receiving a plurality of different types of cutting inserts 18, 20, 22. As seen in FIGS. 3 and 4, each section 12, 14 has a width, W1, W2, of about one-half (½) of a total width, W, of the cutting tool assembly 10 (FIG. 5).

One section 12, 14, for example, the first section 12 may include a dowel pin 23 and a drive key 25 for ensuring that the first section 12 is properly mounted to the second section 14 (FIG. 3). The cutting tool assembly 10 rotates about a central, rotational axis 24, and also has a longitudinal plane 26 that is substantially perpendicular to the central, rotational axis 24. The first section 12 is secured to the second section 14 by inserting a threaded fastener 28 through an aperture 30 in the first section 12 and screwing the threaded fastener 28 into a threaded bore (not shown) in the second section 14.

In the illustrated embodiment, the cutting tool assembly 10 has a total of seven (7) rows of helically-mounted cutting inserts effectively forming helical teeth 44, each helical tooth 44 comprising a total of ten (10) cutting inserts 18, 20, 22. In the illustrated embodiment, each helical tooth 44 has a total of six (6) cutting inserts 18, two (2) cutting inserts 20, and two (2) cutting inserts 22 (some of the cutting inserts 18, 20, 22 may not be visible in FIGS. 1-5). Each row of helically-mounted cutting inserts 18, 20, 22 may be separated by a helical (or spiral) chip flute 46 to aid in the evacuation of chips during a machining operation. In the illustrated embodiment, there is a total of seven (7) chip flutes 46 in the cutting tool assembly 10. However, it will be appreciated that the invention is not limited by the number of helical teeth 44 (rows of cutting inserts) and the number of helical chip flutes 46, and that the invention can be any desirable number of teeth 44 and chip flutes 46, depending on the dimensions of the cutting tool assembly 10. It will also be appreciated that invention can be practiced without the helical chip flutes 46. In this embodiment, the chip gashes 47 would aid in the evacuation of chips during the machining operation.

In one aspect of the invention, the cutting tool assembly 10 includes a plurality of helical teeth 44 comprising a plurality of different types of cutting inserts 18, 20, 22. As used herein, a helix (or helical) is a type of smooth space curve, i.e., a curve in three-dimensional space. It has the property that the tangent line at any point makes a constant angle with a fixed line called the axis. Examples of helices are coil springs and the handrails of spiral staircases. Helices can be either right-handed or left-handed. With the line of sight along the helix's axis, if a clockwise screwing motion moves the helix away from the observer, then it is called a right-handed helix; if towards the observer, then it is a left-handed helix. The pitch of a helix is the width of one complete helix turn, measured parallel to the axis of the helix.

In the illustrated embodiment, the helical teeth 44 are arranged in a left-handed orientation. However, it will be appreciated that the invention can be practiced with helical teeth 44 that are arranged in a right-handed orientation. In this embodiment, the second section 14 would be on the left hand side of the longitudinal plane 26, rather than on the right hand side as shown in FIGS. 1-5. In other words, the cutting tool assembly 10 would be mirror symmetric with respect to the longitudinal axis 26 from the embodiment shown in FIGS. 1-5.

In the illustrated embodiment, the cutting tool assembly 10 has a total of seven (7) rows of helical teeth 44, each helical tooth 44 comprising a total of ten (10) cutting inserts 18, 20, 22. In the illustrated embodiment, each tooth 44 has a total of six (6) cutting inserts 18, two (2) cutting inserts 20, and two (2) cutting inserts 22 (some of the cutting inserts 18, 20, 22 may not be visible in FIGS. 1-5). Each row of helically-mounted cutting inserts 18, 20, 22 may be separated by a helical (or spiral) chip flute 46 to aid in the evacuation of chips during a machining operation. In the illustrated embodiment, there is a total of seven (7) chip flutes 46 in the cutting tool assembly 10. However, it will be appreciated that the invention is not limited by the number of rows of helical teeth 44 and the number of helical chip flutes 46, and that the invention can be any desirable number of teeth 44 and chip flutes 46, depending on the dimensions of the cutting tool assembly 10. It will also be appreciated that invention can be practiced without the helical chip flutes 46. In this embodiment, the chip gashes 47 would aid in the evacuation of chips during the machining operation.

Figure 6:
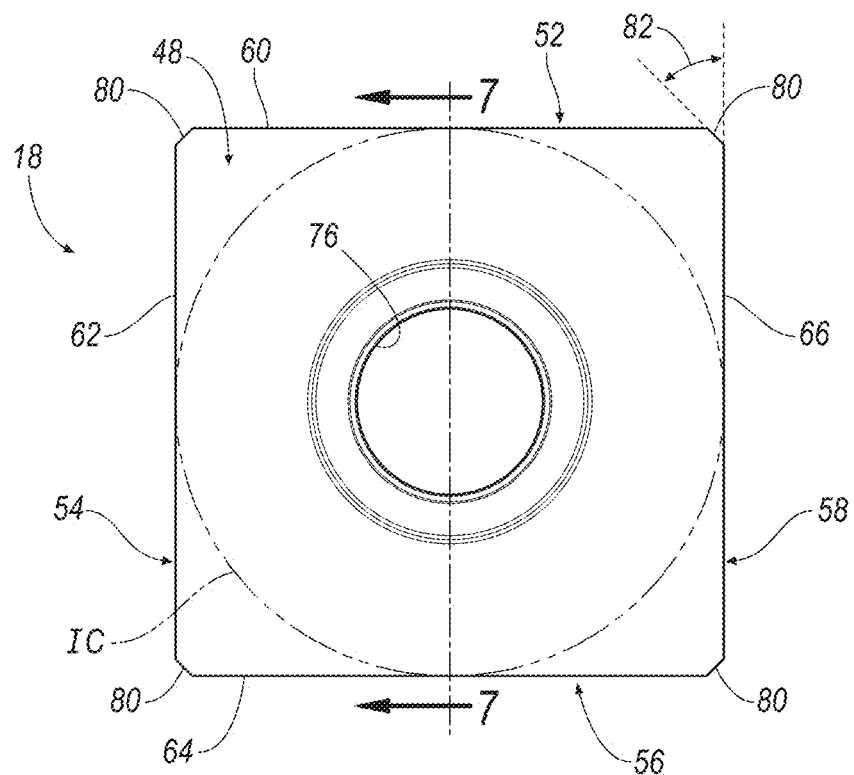
FIG. 6 is a top view of a first type of cutting insert used in the cutting tool assembly according to an embodiment of the invention.
Figure 7:
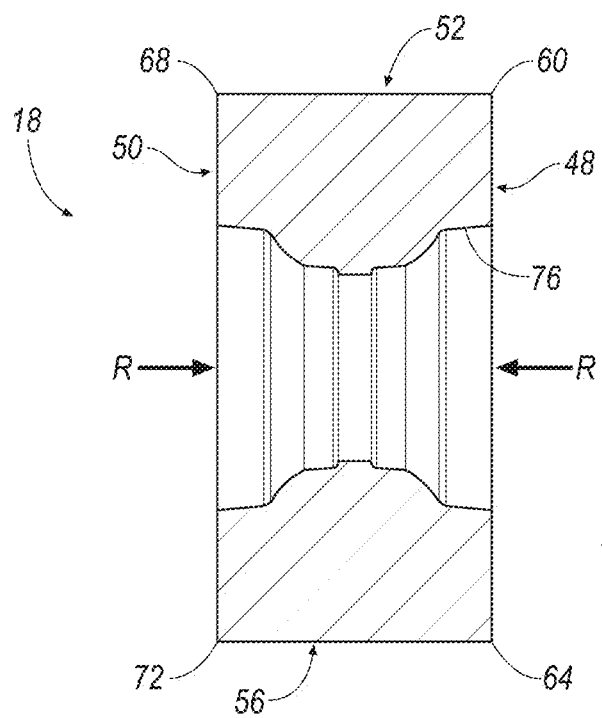
FIG. 7 is a cross-sectional view of the cutting insert taken along line 7-7 of FIG. 6.

Referring now to FIGS. 6 and 7, the cutting insert 18 is shown according to an embodiment of the invention. The cutting insert 18 includes a first surface 48, a second surface 50 opposite the first surface 48, and a plurality of peripheral side surfaces 52, 54, 56, 58 extending between the first and second surfaces 48, 50. In one embodiment, the cutting insert 18 is substantially square in shape such that the peripheral side surfaces 52, 54, 56, 58 contact an inscribed circle, IC, of the cutting insert 18. The cutting insert 18 includes a plurality of cutting edges 60, 62, 64, 66 at an intersection between the first surface 48 and the peripheral side surfaces 52, 54, 56, 58, respectively. Similarly, the cutting insert 18 includes a plurality of cutting edges 68, 70, 72, 74 at an intersection between the second surface 50 and the peripheral side surfaces 52, 54, 56, 58, respectively (only the cutting edges 68, 72 are visible in FIGS. 6 and 7). Thus, the cutting insert 18 is a double-sided cutting insert with a total of eight (8) cutting edges and is symmetric about all three axes (x, y and z). The first surface 48 and the second surface 50 can be formed with a very large radius, R. In one embodiment, the radius, R, is at least 10.00 inch (254.00 mm).

The cutting insert 18 includes a countersunk bore 76 extending between the first and second surfaces 48, 50 for accommodating a mounting screw 78 (FIG. 1) for mounting the cutting insert 18 within the insert-receiving pocket 16. The cutting insert 18 may include a chamfer 80 at an intersection between the first and second surfaces 48, 50 and the peripheral side surfaces 52, 54, 56, 58 to prevent damage to the corners of the cutting insert 18. In one embodiment, the chamfer 80 is formed at an angle 82 with respect to the adjacent peripheral side surfaces 52, 54, 56, 58 of about forty-five (45) degrees.

Referring now to FIGS. 8-10, the cutting insert 20 is shown according to an embodiment of the invention. The cutting insert 20 includes a top surface 84, a bottom surface 86 opposite the top surface 84, and a plurality of peripheral side surfaces 88, 90, 92, 94 extending between the top and bottom surfaces 84, 86. In one embodiment, the cutting insert 20 is substantially rectangular in shape. The cutting insert 20 includes a first cutting edge 96 at an intersection between the top surface 84 and the peripheral side surface 90, and a second cutting edge 98 at an intersection between the top surface 84 and the peripheral side surface 94. Unlike the cutting insert 18, the cutting insert 20 is a single-sided cutting insert with a total of two (2) cutting edges and is symmetric about one (1) axis and non-symmetric about two axes. In addition, the top surface 84 and the cutting edges 96, 98 are formed with a radius, R1, that conforms to the rail top, as described in more detail below. In one embodiment, the radius, R1, is between about 1.00 inch (25.4 mm) and about 1.50 inch (38.1 mm). For example, the radius, R1, can be about 1.25 inch (31.75 mm).

The cutting insert 20 includes a countersunk bore 100 extending between the top and bottom surfaces 84, 86 for accommodating the mounting screw 78 (FIG. 1) for mounting the cutting insert 20 within the insert-receiving pocket 16 of the cutting tool assembly 10. The cutting insert 20 may include a chamfer 102 at an intersection between the top and bottom surfaces 84, 86 and the side surfaces 88, 92 to prevent damage to the corners of the cutting insert 20.

Referring now to FIGS. 11-13, the cutting insert 22 is shown according to an embodiment of the invention. The cutting insert 22 includes a top surface 104, a bottom surface 106 opposite the top surface 104, and a plurality of peripheral side surfaces 108, 110, 112, 114 extending between the top and bottom surfaces 104, 106. In one embodiment, the cutting insert 22 is substantially rectangular in shape. The cutting insert 22 includes a first cutting edge 116 at an intersection between the top surface 104 and the peripheral side surface 110, and a second cutting edge 118 at an intersection between the top surface 104 and the peripheral side surface 114. Unlike the cutting insert 18, the cutting insert 22 is a single-sided cutting insert with a total of two (2) cutting edges and is symmetric about one (1) axis and non-symmetric about two axes. In addition, the top surface 104 and the cutting edges 116, 118 are formed with a radius, R2, that conforms to the rail top, as described in more detail below. In one embodiment, the radius, R2, is between about 0.50 inch (12.7 mm) and about 0.75 inch (19.05 mm). For example, the radius, R2, can be about 0.562 inch (14.29 mm). Thus, the relative magnitude of the radius, R2, of the cutting insert 22 is smaller than the radius, R1, of the cutting insert 20.

The cutting insert 22 includes a countersunk bore 120 extending between the top and bottom surfaces 104, 106 for accommodating the mounting screw 78 (FIG. 1) for mounting the cutting insert 22 within the insert-receiving pocket 16 of the cutting tool assembly 10. The cutting insert 22 may include a chamfer 122 at an intersection between the top and bottom surfaces 104, 106 and the side surfaces 108, 112 to prevent damage to the corners of the cutting insert 22

Figure 14:
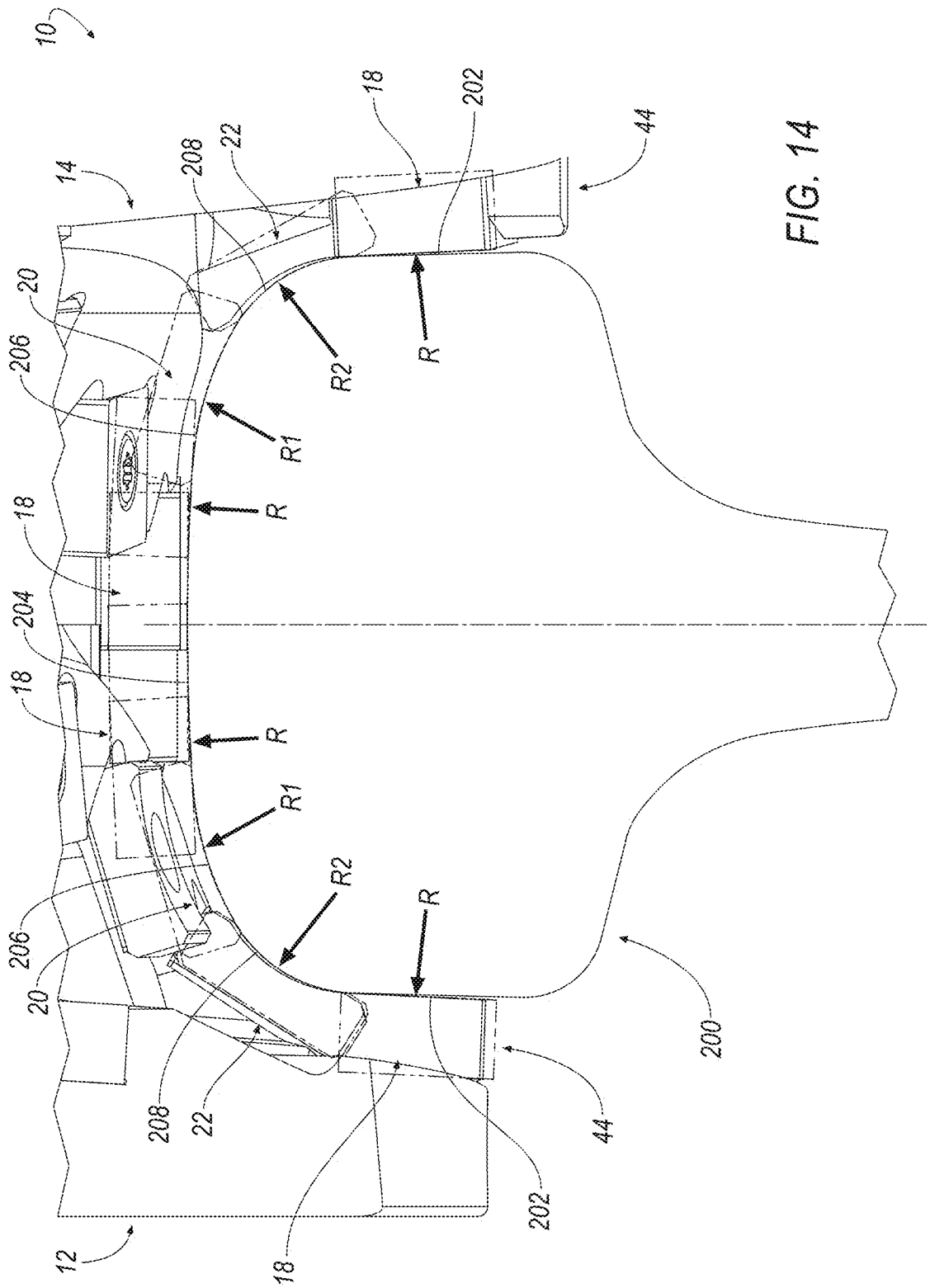
FIG. 14 is an enlarged, partial view of the cutting tool assembly of FIG. 1 forming a rail top during a milling operation.

Referring now to FIG. 14, the cutting tool assembly 10 is designed to form a rail top, shown generally at 200, for a railway (not shown) in an efficient, cost-effective manner. As seen in FIG. 14, the first and second surfaces 48, 50 of the cutting inserts 18 with the radius, R, contact the sidewalls 202 and a top surface 204 of the rail top 200 in an area of the longitudinal plane 26 of the cutting tool assembly 10. The top surface 84 of the cutting inserts 20 with the radius, R1, contacts a first curved portion 206 of the rail top 200, and the top surface 104 of the cutting inserts 22 with the radius, R2, contact a second curved portion 208 of the rail top 200.

It has been demonstrated that the cutting tool assembly 10 tooling pressures tend to push the cutting tool assembly 10 into the spindle, rather than trying to pull the cutting tool out of the spindle. As a result, the cutting tool assembly 10 of the invention provides smoother, more efficient milling of the rail form, a consistent tool pressure during milling operation, improved tool life, and more efficient chip evacuation as compared to conventional cutting tools in which the cutting inserts are randomly arranged on the cutting tool with square pocket chip flutes. Specifically, tests have shown that the cutting tool assembly 10 of the invention reduced power consumption by 20-25% as compared to a conventional cutting tool with randomly-arranged cutting inserts and square pocket chip flutes.

The patents and publications referred to herein are hereby incorporated by reference.

Having described presently preferred embodiments the invention may be otherwise embodied within the scope of the appended claims.

What is claimed is:

1. A cutting tool assembly for milling a rail top, comprising:
a first section; and
a second section mounted to the first section, each section including a plurality of insert-receiving pockets for receiving a plurality of different types of cutting inserts,
wherein the plurality of different types of cutting inserts are arranged in a plurality of helical teeth,
wherein the plurality of different types of cutting inserts comprises a first type of cutting insert, a second type of cutting insert and a third type of cutting insert, and
wherein the first type of cutting insert comprises a double-sided cutting insert having a first surface formed with a radius, R, a second surface opposite the first surface formed with the radius, R, a plurality of peripheral side surfaces extending between the first and second surfaces, a plurality of cutting edges at an intersection between the first surface and the peripheral side surfaces, and a plurality of cutting edges at an intersection between the second surface and the peripheral side surfaces.

2. A cutting tool assembly for milling a rail top, comprising:
a first section; and
a second section mounted to the first section, each section including a plurality of insert-receiving pockets for receiving a plurality of different types of cutting inserts,
wherein the plurality of different types of cutting inserts are arranged in a plurality of helical teeth,
wherein the plurality of different types of cutting inserts comprises a first type of cutting insert, a second type of cutting insert and a third type of cutting insert,
wherein the first type of cutting insert is oriented to contact a sidewall or a top surface of a rail top, wherein the second type of cutting insert is oriented to contact a first curved portion of the rail top, and wherein the third type of cutting insert is oriented to contact a second curved portion of the rail top during a milling operation.

3. A cutting tool assembly for milling a rail top, comprising:
a first section; and
a second section mounted to the first section, each section including a plurality of insert-receiving pockets for receiving a plurality of different types of cutting inserts,
wherein the plurality of different types of cutting inserts are arranged in a plurality of helical teeth,
wherein one or more of the helical teeth each include cutting inserts of at least two of the different types,
wherein the plurality of different types of cutting inserts comprises:
a cutting insert of a first one of the different types, wherein the cutting insert of the first type includes a top surface formed with a given radius,
at least one cutting insert of another one of the different types, wherein each of the at least one cutting insert of another one of the different types includes a top surface with a radius which is smaller than the given radius.

4. The cutting tool assembly according to claim 3, wherein:
the top surface of type of cutting insert is a first surface, and
the first type of cutting insert comprises a double-sided cutting insert having the first surface formed with a radius, R, a second surface opposite the first surface formed with the radius, R, a plurality of peripheral side surfaces extending between the first and second surfaces, a plurality of cutting edges at an intersection between the first surface and the peripheral side surfaces, and a plurality of cutting edges at an intersection between the second surface and the peripheral side surfaces.

5. The cutting tool assembly according to claim 4, wherein the radius, R, is at least 10 inches.

6. The cutting tool assembly according to claim 3, wherein:
the at least one cutting insert of another one of the different types comprises cutting inserts of a second one of the different types and of a third one of the different types, and
the second type of cutting insert comprises a single-sided cutting insert having a top surface formed with a radius, R1, a bottom surface opposite the first surface, a plurality of peripheral side surfaces extending between the top and bottom surfaces, and a plurality of cutting edges at an intersection between the top surface and two of the peripheral side surfaces.

7. The cutting tool assembly according to claim 6, wherein the radius, R1, is between about 1.00 inch (25.4 mm) and 1.50 inch (38.1 mm).

8. The cutting tool assembly according to claim 3, wherein:
the at least one cutting insert of another one of the different types comprises cutting inserts of a second one of the different types and of a third one of the different types, and
the third type of cutting insert comprises a single-sided cutting insert having a top surface formed with a radius, R2, a bottom surface opposite the first surface, a plurality of peripheral side surfaces extending between the top and bottom surfaces, and a plurality of cutting edges at an intersection between the top surface and two of the peripheral side surfaces.

9. The cutting tool assembly according to claim 8, wherein the radius, R2, is between about 0.50 inch (12.7 mm) and about 0.75 inch (19.05 mm).

10. The cutting tool assembly according to claim 3, wherein each of the plurality of helical teeth are separated by a helical chip flute.

11. The cutting tool assembly according to claim 3, wherein the first section has a first width, W1, and wherein the second section has a second width, W2, and wherein the first width, W1, is approximately equal to the second width, W2.

12. The cutting tool assembly according to claim 3, wherein at least one of the different types of cutting inserts comprises a first surface, a second surface, a plurality of peripheral side surfaces extending between the first and second surfaces, and more than two cutting edges at an intersection between the first surface and the peripheral side surfaces.

13. The cutting tool assembly according to claim 12, wherein the at least one of the different types of cutting inserts comprises a double-sided cutting insert.

14. The cutting tool assembly according to claim 3, wherein:
the cutting tool assembly defines a rotational axis, and a longitudinal plane which is perpendicular to the rotational axis;
the cutting insert of the first type being mounted in an area of the longitudinal plane, and
the at least one cutting insert of another one of the different types being mounted further from the longitudinal plane than is the cutting insert of the first one of the different types, as measured along the rotational axis.

15. The cutting tool assembly according to claim 14, wherein:
the cutting insert of the first type is mounted and oriented to contact and form a top surface of a rail top during a rail top milling operation, and
each of the at least one cutting insert of another one of the different types is mounted and oriented to contact and form a curved portion of the rail top during the rail top milling operation.

16. The cutting tool assembly according to claim 3, wherein:
the cutting tool assembly defines a rotational axis, and a longitudinal plane which is perpendicular to the rotational axis;
the cutting insert of the first type is mounted further from the longitudinal plane than is the at least one cutting insert of another one of the different types, as measured along the rotational axis.

17. The cutting tool assembly according to claim 16, wherein:
the cutting insert the first type is mounted and oriented to contact and form a sidewall of a rail top during a rail top milling operation, and
each of the at least one cutting insert of another one of the different types is mounted and oriented to contact and form a curved portion of the rail top during the rail top milling operation.

18. The cutting tool assembly according to claim 3, wherein:
the top surface of the cutting insert of the first type is a first surface formed with a radius, R,
the at least one cutting insert of another one of the different types comprises:
a cutting insert of a second one of the different types, the cutting insert of the second type including a top surface formed with a radius, R1, which is smaller than the radius, R, and
a cutting insert of a third one of the different types, the cutting insert of the third type including a top surface formed with a radius, R2, which is smaller than the radius, R1.

19. The cutting tool assembly according to claim 18, wherein:
the second type of cutting insert is oriented to contact a first curved portion of the rail top during the milling operation, and
the third type of cutting insert is oriented to contact a second curved portion of the rail top during the milling operation.

20. A cutting tool assembly for milling a rail top, comprising:
a first section; and
a second section mounted to the first section, each section including a plurality of insert-receiving pockets for receiving a plurality of different types of cutting inserts,
wherein the plurality of different types of cutting inserts are arranged in a plurality of helical teeth,
wherein one or more of the helical teeth each include cutting inserts of at least two of the different types, and
wherein each of the plurality of helical teeth are separated by a helical chip flute.

* * * * *